United States Patent
Sakurai

(10) Patent No.: US 10,892,462 B2
(45) Date of Patent: Jan. 12, 2021

(54) BATTERY STRUCTURE

(71) Applicant: Honda Motor Co.,Ltd., Tokyo (JP)

(72) Inventor: Atsushi Sakurai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 16/358,710

(22) Filed: Mar. 20, 2019

(65) Prior Publication Data

US 2019/0296317 A1  Sep. 26, 2019

(30) Foreign Application Priority Data

Mar. 22, 2018 (JP) ................. 2018-054377

(51) Int. Cl.
| | |
|---|---|
| H01M 2/26 | (2006.01) |
| H01M 2/12 | (2006.01) |
| H01M 2/08 | (2006.01) |
| H01M 2/36 | (2006.01) |
| H01M 4/48 | (2010.01) |
| H01M 4/66 | (2006.01) |
| H01M 2/02 | (2006.01) |
| H01M 4/02 | (2006.01) |

(52) U.S. Cl.
CPC .......... *H01M 2/26* (2013.01); *H01M 2/0285* (2013.01); *H01M 2/08* (2013.01); *H01M 2/1223* (2013.01); *H01M 2/36* (2013.01); *H01M 4/48* (2013.01); *H01M 4/662* (2013.01); *H01M 2004/027* (2013.01)

(58) Field of Classification Search
CPC ........ H01M 2/26; H01M 2/08; H01M 2/0285; H01M 2/1223
See application file for complete search history.

(56) References Cited

U.S. PATENT DOCUMENTS

| 6,569,561 B1 * | 5/2003 | Kimura | H01M 2/0237 429/120 |
|---|---|---|---|
| 2006/0035140 A1 * | 2/2006 | Matsumoto | H01M 10/0431 429/160 |
| 2012/0141882 A1 * | 6/2012 | Ota | H01M 4/661 429/322 |

FOREIGN PATENT DOCUMENTS

JP   H1167284   3/1999

\* cited by examiner

*Primary Examiner* — Olatunji A Godo
(74) *Attorney, Agent, or Firm* — JCIPRNET

(57) ABSTRACT

The disclosure provides a battery structure. In a battery structure, a plurality of electrode bodies respectively having positive electrode current collecting parts and negative electrode current collecting parts are received in one conductive container. The negative electrode current collecting part of the first electrode body among the plurality of electrode bodies and the positive electrode current collecting part of the second electrode body among the plurality of electrode bodies are electrically connected to the container, such that the first electrode body and the second electrode body are connected in series.

20 Claims, 6 Drawing Sheets

BATTERY STRUCTURE

CROSS-REFERENCE TO RELATED APPLICATION

This application claims the priority of Japan patent application serial no. 2018-054377, filed on Mar. 22, 2018. The entirety of the above-mentioned patent application is hereby incorporated by reference herein and made a part of this specification.

BACKGROUND

Technical Field

The disclosure relates to a battery structure in which a plurality of electrode bodies are received in one container.

Description of Related Art

A battery module (battery pack) such as a lithium ion secondary battery mounted on a hybrid car, an electric car, or the like is composed of a plurality of battery structures (battery cells). The battery structure has a structure in which an electrode body composed of positive electrodes and negative electrodes is received in a container made of metal, and the positive electrodes and the negative electrodes of the electrode body are respectively electrically connected to a positive electrode terminal and a negative electrode terminal provided on a terminal surface of the container.

Patent Document 1 discloses that, in such a battery structure, an auxiliary electrode electrically connected to the container is disposed in addition to the positive electrode terminal and the negative electrode terminal, and the potential of the container is set to a potential intermediate between the positive electrodes and the negative electrodes, so as to solve the problem of corrosion and deterioration of mechanical properties of the container.

RELATED ART

Patent Document(s)

[Patent Document 1] Japanese Laid-open No. H11-67284

In general, in the case where a plurality of battery structures are connected in series, the battery structures are arranged in parallel with an insulating plate interposed therebetween, and the electrode bodies of the battery structures are connected in series by a separate component such as a bus bar. However, in the conventional structure of the battery structure, since the space of the container is determined by the number of electrode bodies, there is a problem that a size increase is inevitable as the battery structures are arranged in parallel. In addition, in order to connect the electrode bodies in series, a component such as a bus bar separate from the battery structure is also necessary. Therefore, if a plurality of electrode bodies are connected in series using the conventional battery structure, there are problems that the number of components increases, the structure becomes complicated, and high cost is incurred.

The technique described in Patent Document 1 focuses on the problem of corrosion and deterioration of mechanical properties of the container and does not mention solving the above-described problems of the battery structure at all.

SUMMARY

The battery structure according to one of the embodiments of the disclosure is a battery structure (e.g., a battery structure to be described later) in which a plurality of electrode bodies (e.g., a first electrode body and a second electrode body to be described later) each having a positive electrode current collecting part (e.g., positive electrode current collecting parts to be described later) and a negative electrode current collecting part (e.g., negative electrode current collecting parts to be described later) are received in one conductive container (e.g., a cell can and a sealing body to be described later), and the negative electrode current collecting part (e.g., the negative electrode current collecting part to be described later) of a first electrode body among the plurality of electrode bodies and the positive electrode current collecting part (e.g., the positive electrode current collecting part to be described later) of a second electrode body among the plurality of electrode bodies are electrically connected to the container, such that the first electrode body and the second electrode body are connected in series.

DESCRIPTION OF THE EMBODIMENTS

Figure 1:
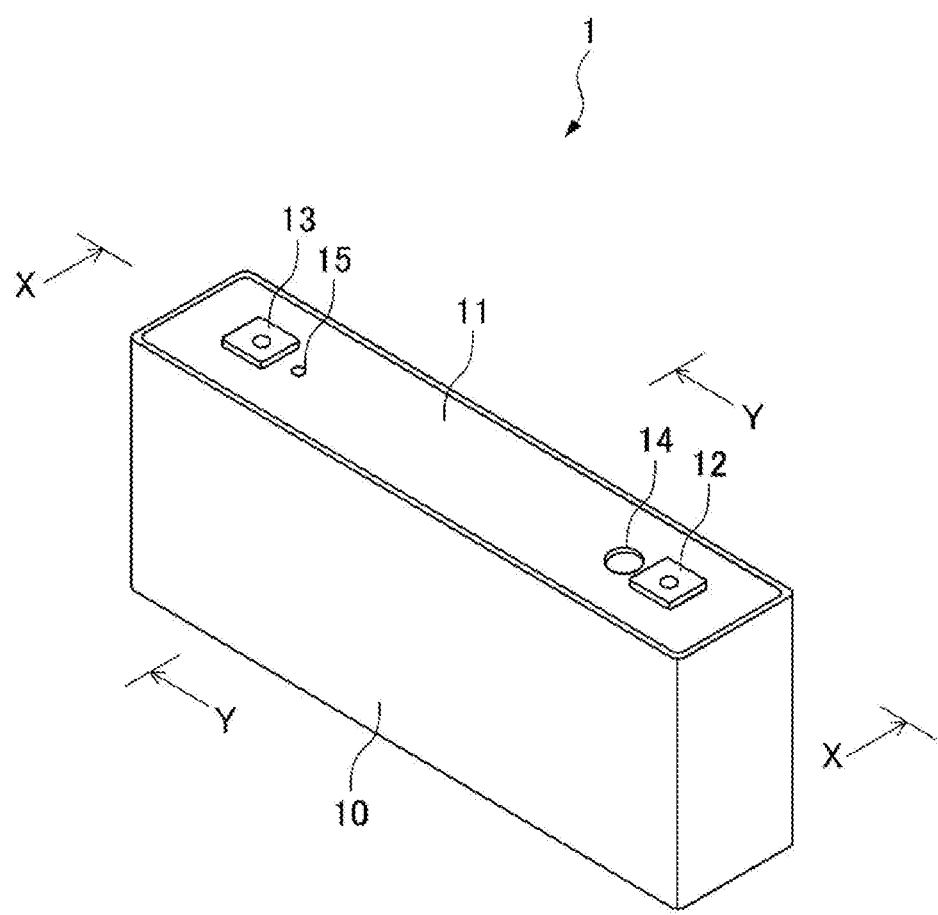
FIG. 1 is a perspective view of a battery structure according to an embodiment of the disclosure.

The disclosure provides a small-size and low-cost battery structure in which a plurality of electrode bodies are connected in series.

According to one of the embodiments, since the negative electrode current collecting part of the first electrode body and the positive electrode current collecting part of the second electrode body can be electrically connected in series in one container via the container, containers for each of the electrode bodies become unnecessary, a separate component such as a bus bar for electrical connection between the electrode bodies is also unnecessary, and it is possible to reduce the size and reduce the cost of the battery structure. In addition, since the intermediate potential can be detected by simply connecting a harness to the container, a terminal for voltage detection becomes unnecessary, and it is also possible to simplify the voltage detection component.

In the battery structure according to one of the embodiments, the negative electrode current collecting part of the first electrode body and the positive electrode current collecting part of the second electrode body may be arranged between the positive electrode current collecting part (e.g., the positive electrode current collecting part 21A to be described later) of the first electrode body and the negative electrode current collecting part (e.g., the negative electrode current collecting part 22B to be described later) of the second electrode body.

According to one of the embodiments, since the negative electrode current collecting part of the first electrode body and the positive electrode current collecting part of the second electrode body are electrically connected at a position close to the central part in the length direction of the electrode bodies, heat generated at the central part of each of the electrode bodies is diffused to the container via the negative electrode current collecting part and the positive electrode current collecting part, and thermal diffusibility of the central part of each of the electrode bodies is improved.

In the battery structure according to one of the embodiments, the container includes a positive electrode terminal (e.g., a positive electrode terminal 12 to be described later) electrically connected to the positive electrode current collecting part (e.g., the positive electrode current collecting part 21A to be described later) of the first electrode body, a negative electrode terminal (e.g., a negative electrode terminal 13 to be described later) electrically connected to the negative electrode current collecting part (e.g., the negative electrode current collecting part 22B to be described later) of the second electrode body and a conductive terminal surface. The conductive terminal surface exposes the positive electrode terminal and the negative electrode terminal to outside, and the negative electrode current collecting part of the first electrode body and the positive electrode current collecting part of the second electrode body are electrically connected to the terminal surface.

According to one of the embodiments, since the current collecting parts of the first electrode body and the second electrode body can be aligned on the same side of the container, the assemblability of the battery structure is improved.

In the battery structure according to one of the embodiments, the container includes a sealing body (e.g., the sealing body 11 to be described later) on a top surface, and the terminal surface is formed by the sealing body.

According to one of the embodiments, since the negative electrode current collecting part of the first electrode body and the positive electrode current collecting part of the second electrode body are electrically connected via the sealing body having a generally large plate thickness, it is possible to reduce the electric resistance. In addition, since it is possible to integrate the sealing body with the electrode bodies in advance, it is unnecessary to perform an electrical connection operation after receiving each of the electrode bodies in the container, and the assemblability of the battery structure is further improved. Furthermore, since the sealing body is arranged on the top surface of the container, it is possible to prevent liquid junction by simply insulating the side surfaces and the bottom surface of each of the electrode bodies, and it is possible to simplify the liquid junction prevention structure of each of the electrode bodies.

In the battery structure according to one of the embodiments, the sealing body may have a pressure relief valve (e.g., a pressure relief valve 14 to be described later) and/or a liquid injection port (e.g., a liquid injection port 15 to be described later) outside a region sandwiched between a connecting portion for the negative electrode current collecting part of the first electrode body and a connecting portion for the positive electrode current collecting part of the second electrode body.

According to one of the embodiments, since the pressure relief valve and/or the liquid injection port is arranged to avoid the portion that generates heat when energized, it is possible to suppress the thermal history of the pressure relief valve and/or the liquid injection port.

In the battery structure according to one of the embodiments, an insulating member (e.g., insulating members 3A and 3B to be described later) is respectively provided between the first electrode body and the second electrode body, between the first electrode body and an inner surface of the container, and between the second electrode body and the inner surface of the container, and the insulating member is opened on a top surface side.

According to one of the embodiments, it is possible to prevent a short circuit between each of the electrode bodies and the container without affecting the electrical connection of the current collecting parts of each of the electrode bodies, and it is possible to simplify the structure for insulation.

In the battery structure according to one of the embodiments, a negative electrode current collecting material of the first electrode body, a positive electrode current collecting material of the second electrode body, and a material of the container are of a same alloy type.

According to one of the embodiments, since the current collecting materials of each of the electrode bodies and the material of the container can be the same, it is possible to suppress the material cost of the battery structure, and since electrical connection can be performed between the same material, it is possible to easily perform welding for establishing electrical connection.

In the battery structure according to one of the embodiments, a negative electrode active material (e.g., a negative electrode active material 202b to be described later) in a negative electrode (e.g., a negative electrode 202 to be described later) of the first electrode body and a negative electrode (e.g., a negative electrode 202 to be described later) of the second electrode body is an oxide, and the negative electrode current collecting material of the first electrode body, the positive electrode current collecting material of the second electrode body, and the material of the container are an aluminum alloy.

According to one of the embodiments, the processability of the container is good, and the weight of the battery structure can be reduced.

Effects

According to the disclosure, it is possible to provide a small-size and low-cost battery structure in which a plurality of electrode bodies are connected in series.

Figure 2:
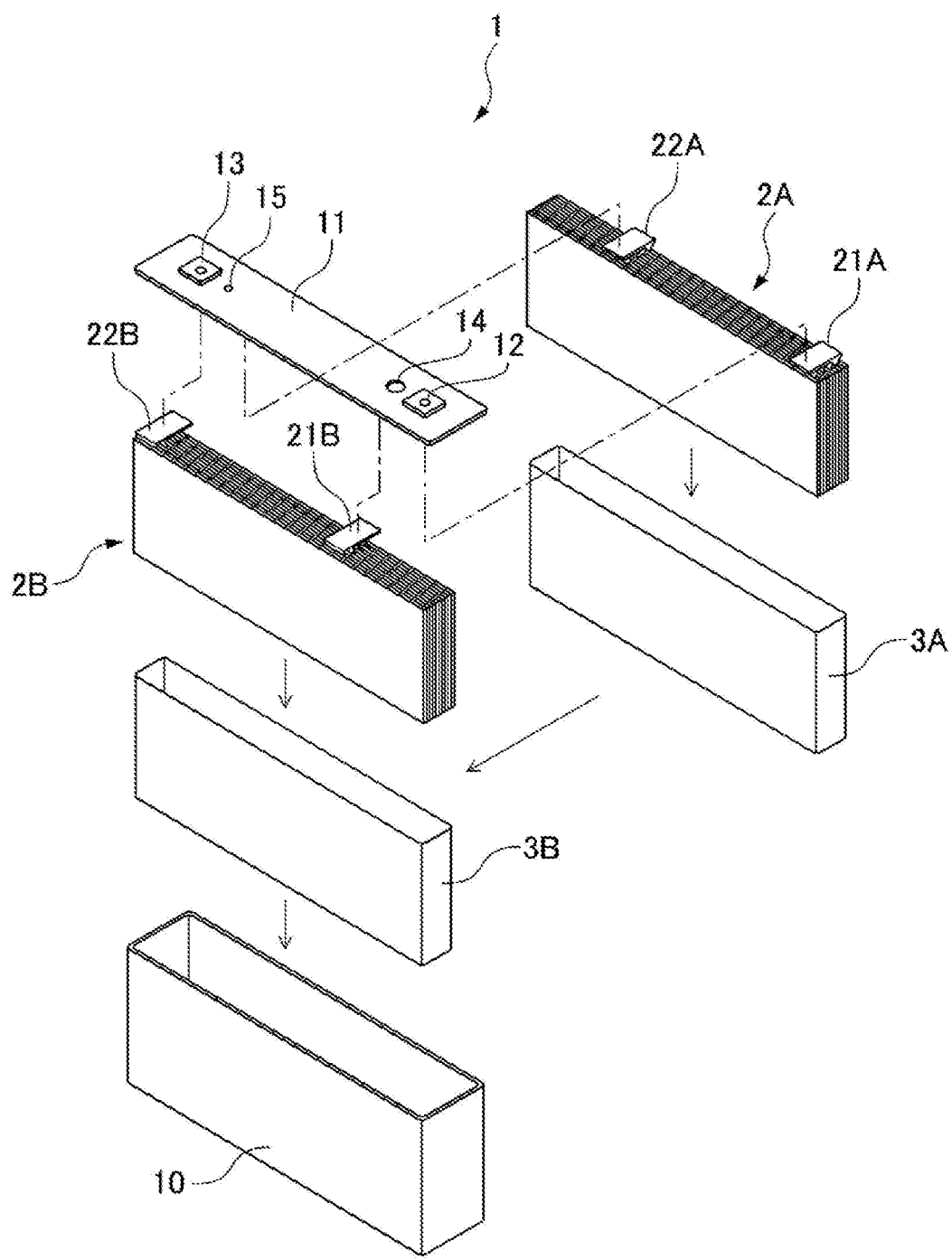
FIG. 2 is an exploded perspective view of the battery structure shown in FIG. 1.
Figure 3:
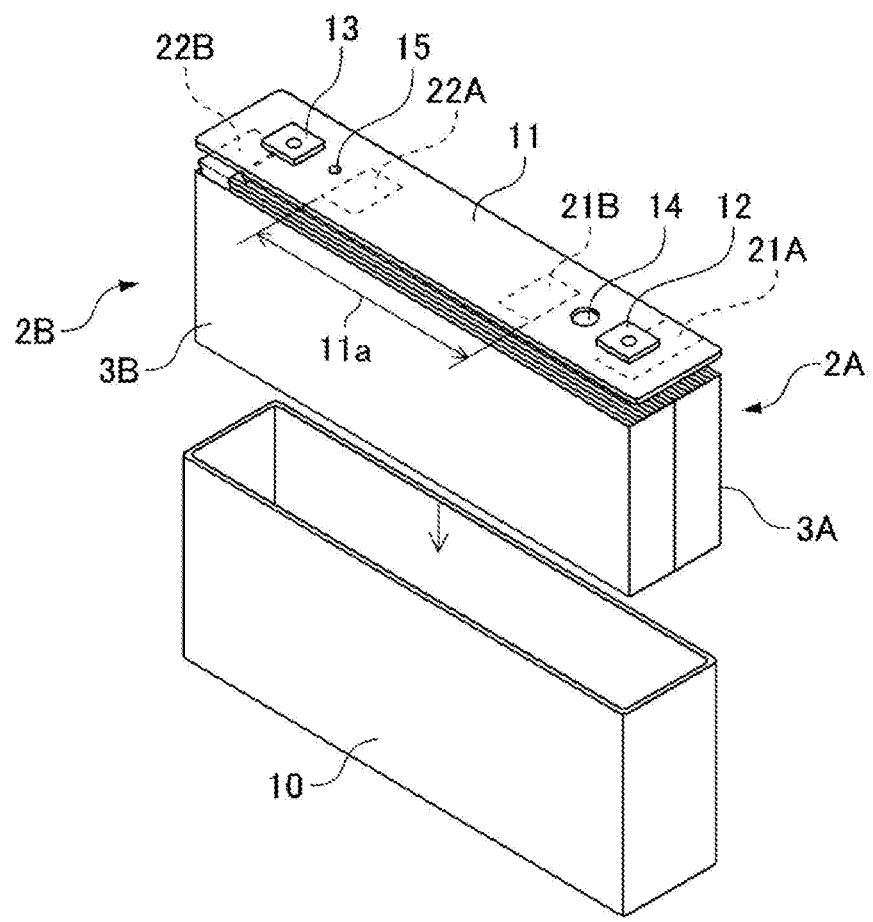
FIG. 3 is a perspective view showing how electrode bodies are received in a container to form the battery structure.

Embodiments of the disclosure will be described in detail below with reference to the drawings. As shown in FIG. 2 and FIG. 3, a battery structure 1 is configured by receiving two electrode bodies, including a first electrode body 2A and a second electrode body 2B, in a container composed of a cell can 10 and a sealing body 11.

Figure 8:
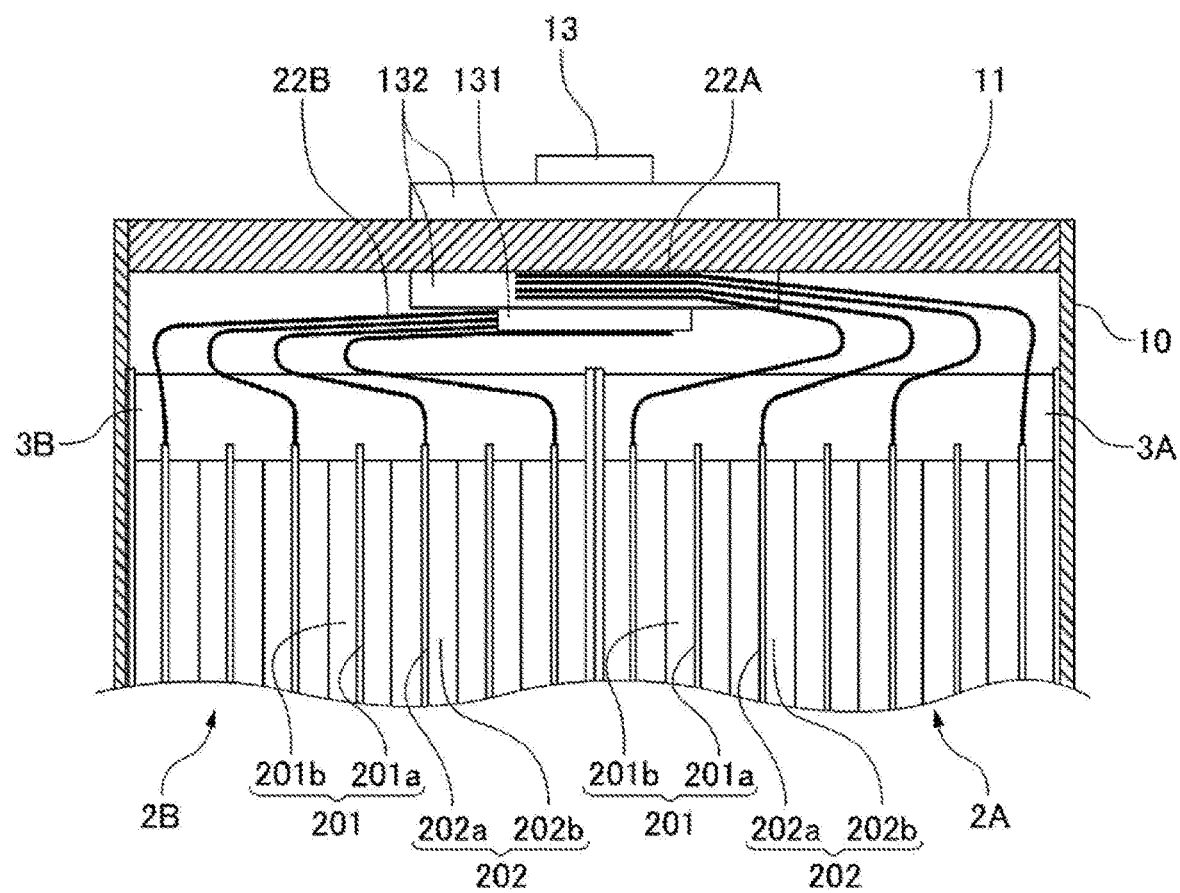
FIG. 8 is a cross-sectional view showing a part of the battery structure taken along line Y-Y in FIG. 1.

As shown in FIG. 8, the first electrode body 2A and the second electrode body 2B are configured by alternately stacking a plurality of positive electrodes 201 and a plurality of negative electrodes 202 via separators (not shown). The structures of the positive electrode 201 and the negative electrode 202 of the first electrode body 2A and the second electrode body 2B are the same. The positive electrode 201 has a flat plate-shaped positive electrode foil 201a and a positive electrode active material 201b coated on the surface of the positive electrode foil 201a. The negative electrode 202 has a flat plate-shaped negative electrode foil 202a and a negative electrode active material 202b coated on the surface of the negative electrode foil 202a.

Figure 4:
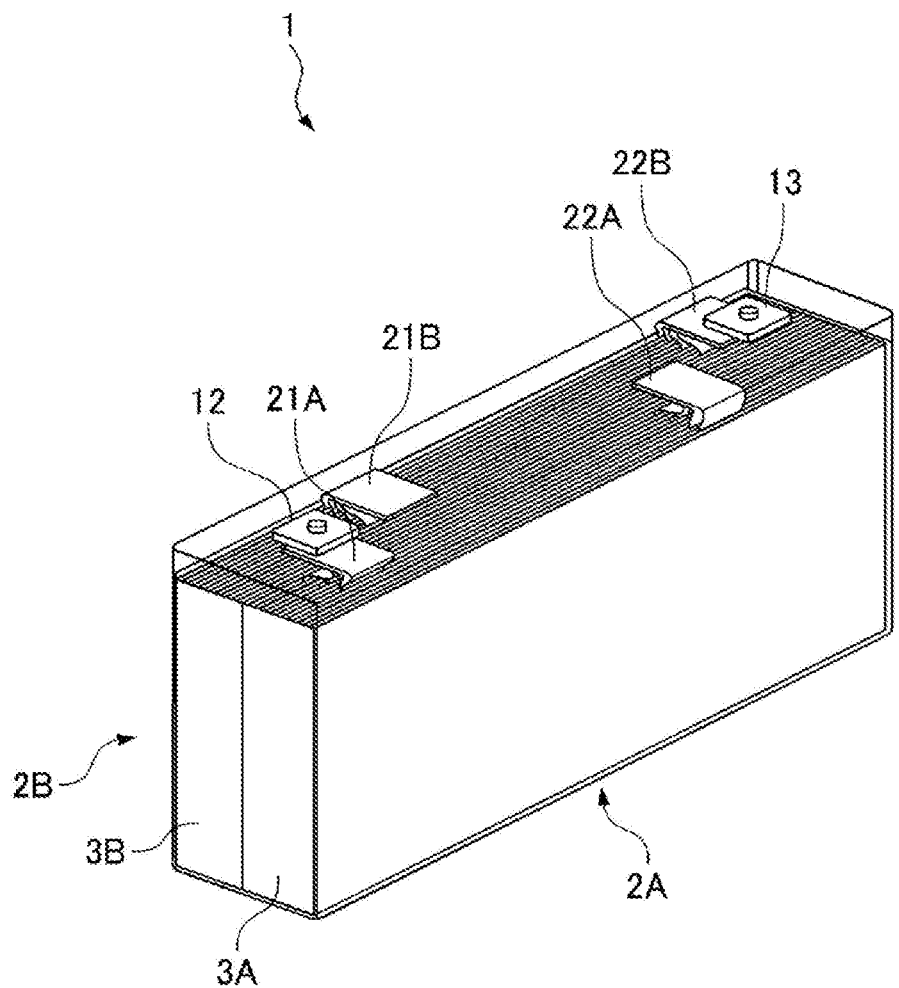
FIG. 4 is a see-through perspective view of the battery structure showing the electrode bodies inside the container.
Figure 5:
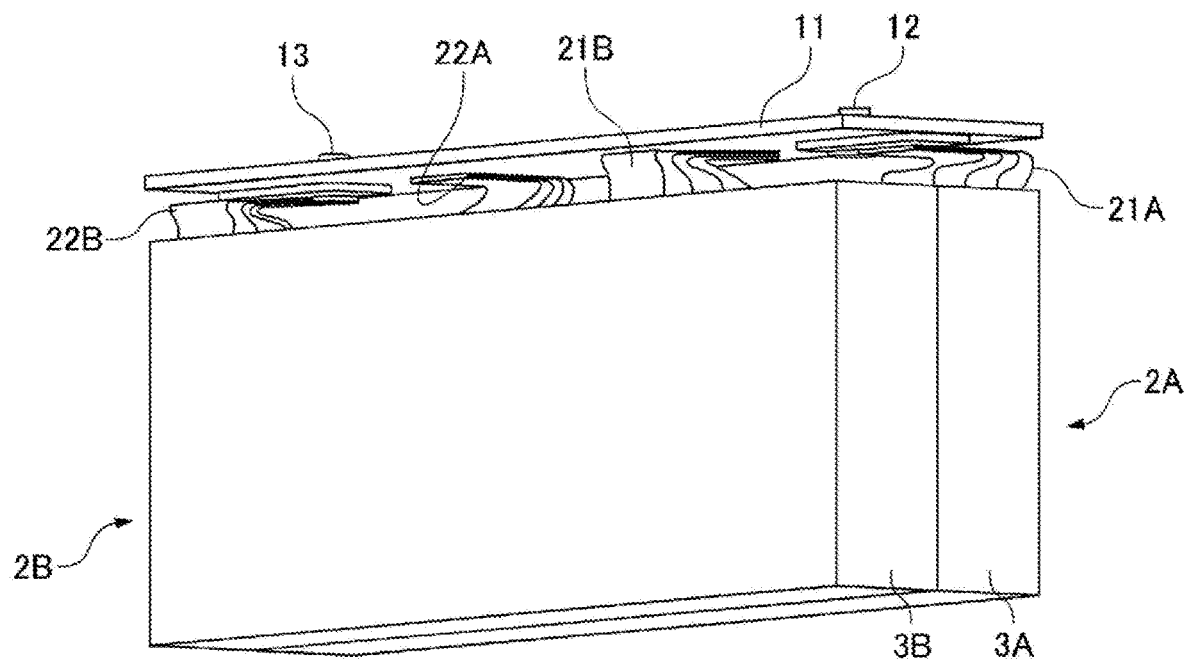
FIG. 5 is a view of the electrode bodies connected to a sealing body as viewed obliquely from below.

As shown in FIG. 2 and FIG. 4, the first electrode body 2A has a positive electrode current collecting part 21A and a negative electrode current collecting part 22A at the upper part. The positive electrode current collecting part 21A is configured in a flat plate shape by having the upper ends of the positive electrode foils 201a of the positive electrodes 201 partially extended into a band shape and stacked and bundled into one. The negative electrode current collecting part 22A is configured in a flat plate shape by having the upper ends of the negative electrode foils 202a of the negative electrodes 202 partially extended into a band shape and stacked and bundled into one. The positive electrode current collecting part 21A and the negative electrode current collecting part 22A are laterally bent at the upper part of the first electrode body 2A to form a plane substantially parallel to the upper surface of the first electrode body 2A.

The positive electrode current collecting part 21A of the first electrode body 2A is arranged at one end in the length direction (the direction orthogonal to the stacking direction of the positive electrodes 201 and the negative electrodes 202) at the upper part of the first electrode body 2A. In other words, the positive electrode current collecting part 21A is formed by having the upper ends of one end of the positive electrode foils 201a of the positive electrodes 201 partially extended into a band shape. On the other hand, the negative electrode current collecting part 22A is arranged to be slightly shifted toward the center from the other end in the length direction at the upper part of the first electrode body 2A. In other words, the negative electrode current collecting part 22A is formed by partially extending the upper ends, which are slightly closer to the center than the other ends of the negative electrode foils 202a of the negative electrodes 202, into a band shape.

On the other hand, the second electrode body 2B also has a positive electrode current collecting part 21B and a negative electrode current collecting part 22B at the upper part. The positive electrode current collecting part 21B is configured in a flat plate shape by having the upper ends of the positive electrode foils 201a of the positive electrodes 201 partially extended into a band shape and stacked and bundled into one. The negative electrode current collecting part 22B is configured in a flat plate shape by having the upper ends of the negative electrode foils 202a of the negative electrodes 202 partially extended into a band shape and stacked and bundled into one. The positive electrode current collecting part 21B and the negative electrode current collecting part 22B are laterally bent at the upper part of the second electrode body 2B to form a plane substantially parallel to the upper surface of the second electrode body 2B.

The positive electrode current collecting part 21B of the second electrode body 2B is arranged to be slightly shifted toward the center from one end in the length direction (the direction orthogonal to the stacking direction of the positive electrodes 201 and the negative electrodes 202) at the upper part of the second electrode body 2B. In other words, the positive electrode current collecting part 21B is formed by having the upper ends slightly toward the center from one end of the positive electrode foils 201a of the positive electrodes 201 partially extended into a band shape. On the other hand, the negative electrode current collecting part 22B is arranged at the other end in the length direction at the upper part of the second electrode body 2B. In other words, the negative electrode current collecting part 22B is formed by having the upper ends of the other end of the negative electrode foils 202a of the negative electrodes 202 partially extended into a band shape.

As shown in FIG. 2, FIG. 3, and FIG. 8, the first electrode body 2A and the second electrode body 2B are respectively accommodated in insulating members 3A and 3B. Each of the insulating members 3A and 3B is made of an insulating sheet material and is formed in a bag shape having substantially the same shape as those of the first electrode body 2A and the second electrode body 2B and having an open upper part. The first electrode body 2A and the second electrode body 2B are respectively accommodated in the insulating members 3A and 3B with the positive electrode current collecting parts 21A and 21B and the negative electrode current collecting parts 22A and 22B oriented upward.

The first electrode body 2A and the second electrode body 2B respectively accommodated in the insulating members 3A and 3B are arranged in parallel in the stacking direction of the positive electrodes 201 and the negative electrodes 202 and are received in one cell can 10. The cell can 10 is formed of a conductive material in a rectangular parallelepiped shape capable of receiving the first electrode body 2A and the second electrode body 2B arranged in parallel, and the top surface side (upper side in each drawing) of the cell can 10 is a rectangular opening.

Since the first electrode body 2A and the second electrode body 2B are respectively accommodated in the insulating members 3A and 3B, the first electrode body 2A and the second electrode body 2B are electrically insulated from each other by the insulating members 3A and 3B. The first electrode body 2A and the inner surface of the cell can 10 are also electrically insulated from each other, and the second electrode body 2B and the inner surface of the cell can 10 are also electrically insulated from each other. Therefore, it is possible to prevent a short circuit between each of the electrode bodies 2A and 2B and the cell can 10. Further, as shown in FIG. 8, since the top surface side (upper side in FIG. 8) of the insulating members 3A and 3B is opened, it is also possible to simplify the structure for insulation.

With the first electrode body 2A and the second electrode body 2B arranged in parallel, all of the positive electrode current collecting parts 21A and 21B and the negative electrode current collecting parts 22A and 22B are arranged at the upper parts of the first electrode body 2A and the second electrode body 2B. The sealing body 11 is attached to the upper parts of the first electrode body 2A and the second electrode body 2B.

The sealing body 11 is made of a conductive flat plate member formed in the same rectangular shape as the opening shape of the cell can 10. With the sealing body 11 covering the opening of the cell can 10, the cell can 10 and the sealing body 11 form a container for receiving the first electrode body 2A and the second electrode body 2B inside. The sealing body 11 has a plate thickness greater than the plate thickness of the cell can 10 so as to resist the pressure inside the cell can 10.

Figure 6:
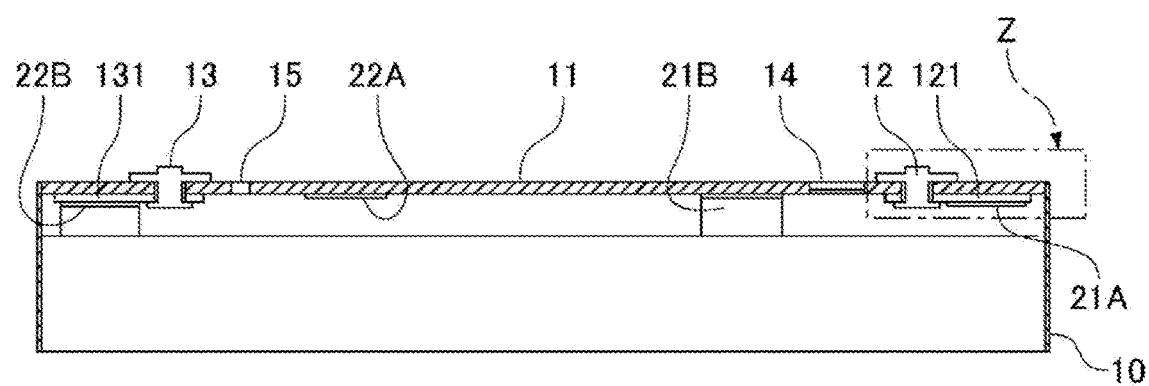
FIG. 6 is a cross-sectional view showing a part of the battery structure taken along line X-X in FIG. 1.
Figure 7:
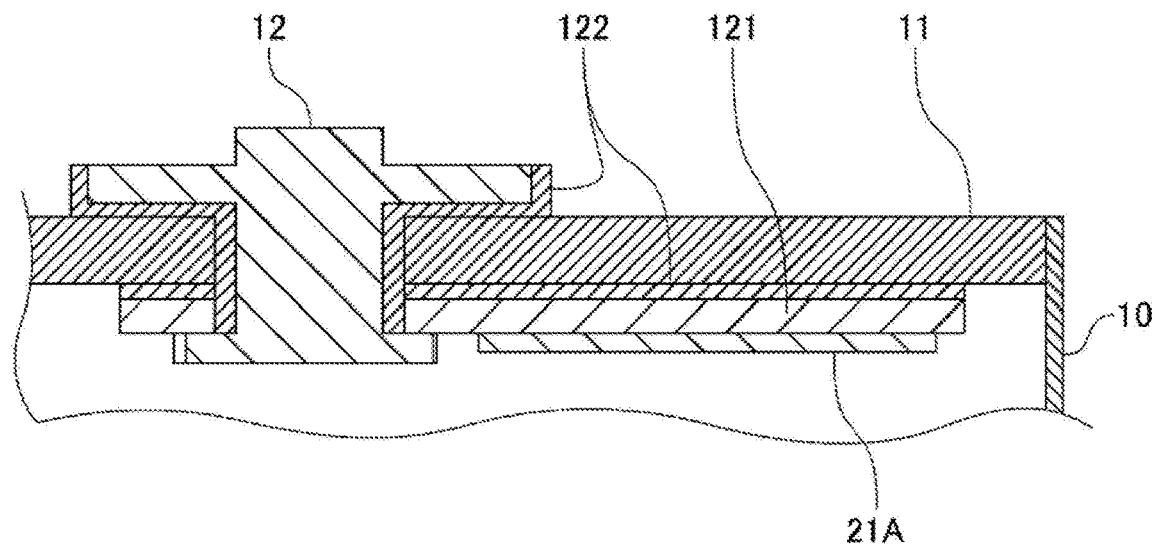
FIG. 7 is an enlarged cross-sectional view of Z in FIG. 6.

The sealing body 11 has a positive electrode terminal 12 and a negative electrode terminal 13 of the battery structure 1. As shown in FIG. 6 and FIG. 7, the positive electrode terminal 12 is arranged on one end side in the length direction of the sealing body 11, penetrates through the sealing body 11, and is protruding and exposed from the upper surface of the sealing body 11. An internal connection bus bar 121 electrically connected to the positive electrode terminal 12 is provided on the rear surface of the sealing body 11. An insulating material 122 is provided between the positive electrode terminal 12 and the internal connection bus bar 121 and the sealing body 11 to achieve electrical insulation from the conductive sealing body 11.

On the other hand, the negative electrode terminal 13 also has the same structure as that of the positive electrode terminal 12. Namely, as shown in FIG. 6, the negative electrode terminal 13 is arranged on the other end side in the length direction of the sealing body 11, penetrates through the sealing body 11, and is protruding and exposed from the upper surface of the sealing body 11. An internal connection bus bar 131 electrically connected to the negative electrode terminal 13 is provided on the rear surface of the sealing body 11. Although not shown in FIG. 6, similar to the insulating material 122 on the side of the positive electrode terminal 12, an insulating material is provided between the negative electrode terminal 13 and the internal connection bus bar 131 and the sealing body 11 to achieve electrical insulation from the conductive sealing body 11.

In the present embodiment, in the sealing body 11, the positive electrode terminal 12 electrically connected to the positive electrode current collecting part 21A of the first electrode body 2A and the negative electrode terminal 13 electrically connected to the negative electrode current collecting part 22B of the second electrode body 2B form a terminal surface exposed to the outside.

As shown in FIG. 2 to FIG. 5, the positive electrode current collecting part 21A of the first electrode body 2A is electrically connected to the internal connection bus bar 121 of the positive electrode terminal 12. The positive electrode current collecting part 21A is electrically connected to the positive electrode terminal 12 via the internal connection bus bar 121 on the rear surface of the sealing body 11. On the other hand, the negative electrode current collecting part 22A of the first electrode body 2A is directly electrically connected to a portion on the rear surface of the sealing body 11 closer to the center (closer to the positive electrode terminal 12) than the negative electrode terminal 13.

Further, the positive electrode current collecting part 21B of the second electrode body 2B is directly electrically connected to a portion on the rear surface of the sealing body 11 closer to the center (closer to the negative electrode terminal 13) than the positive electrode terminal 12. On the other hand, the negative electrode current collecting part 22B of the second electrode body 2B is electrically connected to the internal connection bus bar 131 of the negative electrode terminal 13. The negative electrode current collecting part 22B is electrically connected to the negative electrode terminal 13 via the internal connection bus bar 131.

In this way, the negative electrode current collecting part 22A of the first electrode body 2A and the positive electrode current collecting part 21B of the second electrode body 2B are directly electrically connected to the rear surface of the sealing body 11, such that the first electrode body 2A and the second electrode body 2B are connected in series via the sealing body 11.

The first electrode body 2A and the second electrode body 2B are received in parallel in the cell can 10, and the top surface side of the cell can 10 is covered with the sealing body 11. The cell can 10 and the sealing body 11 are fixed together by welding, caulking or the like. Thereby, the battery structure 1 shown in FIG. 1 is formed. Since the first electrode body 2A and the second electrode body 2B are insulated from each other by the insulating members 3A and 3B, a short circuit between the electrode bodies 2A and 2B does not occur. In addition, since the electrode bodies 2A and 2B and the cell can 10 are also insulated from each other by the insulating members 3A and 3B, a short circuit between the electrode bodies 2A and 2B and the cell can 10 does not occur.

In the battery structure 1 configured in this manner, since the negative electrode current collecting part 22A of the first electrode body 2A and the positive electrode current collecting part 21B of the second electrode body 2B can be connected in series in one container composed of the cell can 10 and the sealing body 11, containers for each of the electrode bodies 2A and 2B are unnecessary, and a separator between the containers can be omitted. In addition, a separate component such as a bus bar for electrical connection between the electrode bodies 2A and 2B is unnecessary. Therefore, even though the battery structure 1 includes a plurality of electrode bodies 2A and 2B connected in series, it is possible to reduce the size and reduce the cost of the battery structure 1.

Also, according to this battery structure 1, since the intermediate potential can be detected by simply connecting a harness to the sealing body 11 which forms the container, a voltage detection terminal for detecting the intermediate potential is also unnecessary. Therefore, it is possible to simplify the voltage detection component.

As shown in FIG. 3 to FIG. 6, in the battery structure 1 described in the present embodiment, the negative electrode current collecting part 22A of the first electrode body 2A and the positive electrode current collecting part 21B of the second electrode body 2B are arranged between the positive electrode current collecting part 21A of the first electrode body 2A and the negative electrode current collecting part 22B of the second electrode body 2B. Therefore, the negative electrode current collecting part 22A of the first electrode body 2A and the positive electrode current collecting part 21B of the second electrode body 2B are electrically connected via the sealing body 11 at a position close to the central part in the length direction of the electrode bodies 2A and 2B. In this way, the heat generated at the central part of each of the electrode bodies 2A and 2B is diffused to the sealing body 11 and further to the cell can 10 via the negative electrode current collecting part 22A and the positive electrode current collecting part 21B, and the effect of improving thermal diffusibility of each of the electrode bodies 2A and 2B is obtained.

Further, in the present embodiment, since the negative electrode current collecting part 22A of the first electrode body 2A and the positive electrode current collecting part 21B of the second electrode body 2B are configured to be electrically connected to the terminal surface having the positive electrode terminal 12 and the negative electrode terminal 13, it is possible to align the current collecting parts 21A, 22A, 21B, and 22B of the first electrode body 2A and the second electrode body 2B on the same side of the container composed of the cell can 10 and the sealing body 11. As a result, it is possible to perform electrical connection of the current collecting parts 21A, 22A, 21B, and 22B from the same side, and it is possible to improve the assemblability of the battery structure 1.

The terminal surface may be formed by the sealing body 11 as in the present embodiment. As the sealing body 11 has a plate thickness greater than that of the cell can 10, by electrically connecting the negative electrode current collecting part 22A of the first electrode body 2A and the positive electrode current collecting part 21B of the second electrode body 2B to the sealing body 11, it is possible to reduce the electric resistance.

By electrically connecting the negative electrode current collecting part 22A of the first electrode body 2A and the positive electrode current collecting part 21B of the second electrode body 2B to the sealing body 11, it is also possible to integrate the sealing body 11 with the electrode bodies 2A and 2B in advance before receiving them in the cell can 10. Thereby, as shown in FIG. 3, after receiving the electrode bodies 2A and 2B integrated with the sealing body 11 in the cell can 10, it is possible to configure the battery structure 1 by simply bonding the cell can 10 and the sealing body 11. Therefore, it is unnecessary to perform an electrical connection operation after receiving each of the electrode bodies 2A and 2B in the cell can 10, and it is possible to further improve the assemblability of the battery structure 1.

Further, by arranging the sealing body 11 on the top surface of the container composed of the cell can 10, the current collecting parts 21A, 22A, 21B, and 22B are also all oriented to the top surface. Therefore, it is possible to prevent liquid junction by simply insulating the side surfaces and the bottom surface of each of the electrode bodies 2A and 2B. As a result, it is possible to simplify the liquid junction prevention structure of each of the electrode bodies 2A and 2B.

The battery structure 1 shown in the present embodiment includes a pressure relief valve 14 and a liquid injection port 15 in the sealing body 11. As shown in FIG. 3 and FIG. 6, the pressure relief valve 14 and the liquid injection port 15 are arranged outside a region 11a sandwiched between the connecting portion between the sealing body 11 and the negative electrode current collecting part 22A of the first electrode body 2A and the connecting portion between the sealing body 11 and the positive electrode current collecting part 21B of the second electrode body 2B, namely, at the two end sides in the length direction of the sealing body 11. In particular, the pressure relief valve 14 is arranged between the connecting portion (the portion of the broken line indicated by numeral 21B in FIG. 3) between the sealing body 11 and the positive electrode current collecting part 21B of the second electrode body 2B and the positive electrode terminal 12. On the other hand, the liquid injection port 15 is arranged between the connecting portion (the portion of the broken line indicated by numeral 22A in FIG. 3) between the sealing body 11 and the negative electrode current collecting part 22A of the first electrode body 2A and the negative electrode terminal 13.

Due to electrical connection between the negative electrode current collecting part 22A of the first electrode body 2A and the positive electrode current collecting part 21B of the second electrode body 2B, the sealing body 11 generates heat during energization. This heat generation is particularly significant between the negative electrode current collecting part 22A and the positive electrode current collecting part 21B. However, according to the arrangement configuration of the pressure relief valve 14 and the liquid injection port 15 of the present embodiment, since the pressure relief valve 14 and the liquid injection port 15 are arranged to avoid the region 11a which is the portion that generates heat when energized, it is possible to suppress the thermal history of the pressure relief valve 14 and the liquid injection port 15. In the present embodiment, both the pressure relief valve 14 and the liquid injection port 15 are arranged outside the region 11a, but it is possible to arrange only one of the pressure relief valve 14 and the liquid injection port 15 outside the region 11a.

In the battery structure 1, the negative electrode current collecting material of the first electrode body 2A (i.e., the negative electrode foil 202a of the negative electrode 202 and the negative electrode current collecting part 22A in the first electrode body 2A), the positive electrode current collecting material of the second electrode body 2B (i.e., the positive electrode foil 201a of the positive electrode 201 and the positive electrode current collecting part 21B in the second electrode body 2B), and the materials of the cell can 10 and the sealing body 11 composing the container may be the same alloy type. Therefore, since the current collecting material of each of the electrode bodies 2A and 2B and the material of the materials of the cell can 10 and sealing body 11 can be aligned, it is possible to suppress the material cost of the battery structure 1, and since electrical connection can be performed between the same materials, it is possible to easily perform welding for establishing electrical connection.

Furthermore, in the case where the negative electrode active material 202b in the negative electrode 202 of the first electrode body 2A and the negative electrode 202 of the second electrode body 2B is an oxide such as LTO (lithium titanate) or the like, the negative electrode current collecting material (i.e., the negative electrode foil 202a and the negative electrode current collecting part 22A) of the first electrode body 2A, the positive electrode current collecting material (i.e., the positive electrode foil 201a and the positive electrode current collecting part 21B) of the second electrode body 2B, and the materials of the cell can 10 and the sealing body 11 may all be an aluminum alloy. Since the aluminum alloy has good processability, the cell can 10 and the sealing body 11 can be easily processed. Further, since the aluminum alloy is lightweight, the weight of the battery structure 1 can be reduced.

What is claimed is:

1. A battery structure, in which a plurality of electrode bodies each having a positive electrode current collecting part and a negative electrode current collecting part are received in one conductive container,
   wherein the first electrode body and the second electrode body are connected in series by electrically connecting the negative electrode current collecting part of a first electrode body among the plurality of electrode bodies and the positive electrode current collecting part of a second electrode body among the plurality of electrode bodies to the container.

2. The battery structure according to claim 1,
   wherein the negative electrode current collecting part of the first electrode body and the positive electrode current collecting part of the second electrode body are arranged between the positive electrode current collecting part of the first electrode body and the negative electrode current collecting part of the second electrode body.

3. The battery structure according to claim 1,
   wherein the container comprises a positive electrode terminal electrically connected to the positive electrode current collecting part of the first electrode body, a negative electrode terminal electrically connected to the negative electrode current collecting part of the second electrode body and a conductive terminal surface, the conductive terminal surface exposes the positive electrode terminal and the negative electrode terminal to outside, and
   the negative electrode current collecting part of the first electrode body and the positive electrode current collecting part of the second electrode body are electrically connected to the terminal surface.

4. The battery structure according to claim 2,
   wherein the container comprises a conductive terminal surface from which a positive electrode terminal electrically connected to the positive electrode current collecting part of the first electrode body and a negative electrode terminal electrically connected to the negative electrode current collecting part of the second electrode body are exposed to outside, and
   the negative electrode current collecting part of the first electrode body and the positive electrode current collecting part of the second electrode body are electrically connected to the terminal surface.

5. The battery structure according to claim 3,
wherein the container comprises a sealing body on a top surface of the container, and
the terminal surface is formed by the sealing body.

6. The battery structure according to claim 5,
wherein the sealing body comprises a pressure relief valve and/or a liquid injection port outside a region sandwiched between a connecting portion for the negative electrode current collecting part of the first electrode body and a connecting portion for the positive electrode current collecting part of the second electrode body.

7. The battery structure according to claim 5,
wherein an insulating member is respectively provided between the first electrode body and the second electrode body, between the first electrode body and an inner surface of the container, and between the second electrode body and the inner surface of the container, and
the insulating member is opened on a top surface side.

8. The battery structure according to claim 6,
wherein an insulating member is respectively provided between the first electrode body and the second electrode body, between the first electrode body and an inner surface of the container, and between the second electrode body and the inner surface of the container, and
the insulating member is opened on a top surface side.

9. The battery structure according to claim 1,
wherein a negative electrode current collecting material of the first electrode body, a positive electrode current collecting material of the second electrode body, and a material of the container are of a same alloy type.

10. The battery structure according to claim 2,
wherein a negative electrode current collecting material of the first electrode body, a positive electrode current collecting material of the second electrode body, and a material of the container are of a same alloy type.

11. The battery structure according to claim 3,
wherein a negative electrode current collecting material of the first electrode body, a positive electrode current collecting material of the second electrode body, and a material of the container are of a same alloy type.

12. The battery structure according to claim 4,
wherein a negative electrode current collecting material of the first electrode body, a positive electrode current collecting material of the second electrode body, and a material of the container are of a same alloy type.

13. The battery structure according to claim 5,
wherein a negative electrode current collecting material of the first electrode body, a positive electrode current collecting material of the second electrode body, and a material of the container are of a same alloy type.

14. The battery structure according to claim 6,
wherein a negative electrode current collecting material of the first electrode body, a positive electrode current collecting material of the second electrode body, and a material of the container are of a same alloy type.

15. The battery structure according to claim 7,
wherein a negative electrode current collecting material of the first electrode body, a positive electrode current collecting material of the second electrode body, and a material of the container are of a same alloy type.

16. The battery structure according to claim 8,
wherein a negative electrode current collecting material of the first electrode body, a positive electrode current collecting material of the second electrode body, and a material of the container are of a same alloy type.

17. The battery structure according to claim 9,
wherein a negative electrode active material in a negative electrode of the first electrode body and a negative electrode of the second electrode body is an oxide, and the negative electrode current collecting material of the first electrode body, the positive electrode current collecting material of the second electrode body, and the material of the container are an aluminum alloy.

18. The battery structure according to claim 10,
wherein a negative electrode active material in a negative electrode of the first electrode body and a negative electrode of the second electrode body is an oxide, and the negative electrode current collecting material of the first electrode body, the positive electrode current collecting material of the second electrode body, and the material of the container are an aluminum alloy.

19. The battery structure according to claim 11,
wherein a negative electrode active material in a negative electrode of the first electrode body and a negative electrode of the second electrode body is an oxide, and the negative electrode current collecting material of the first electrode body, the positive electrode current collecting material of the second electrode body, and the material of the container are an aluminum alloy.

20. The battery structure according to claim 12,
wherein a negative electrode active material in a negative electrode of the first electrode body and a negative electrode of the second electrode body is an oxide, and the negative electrode current collecting material of the first electrode body, the positive electrode current collecting material of the second electrode body, and the material of the container are an aluminum alloy.

* * * * *